(12) United States Patent
Eckelberry

(10) Patent No.: US 7,261,177 B2
(45) Date of Patent: *Aug. 28, 2007

(54) PNEUMATIC LOCKING PIN OPERATING SYSTEM FOR A TRAILER SLIDER

(75) Inventor: Jim Eckelberry, Canton, OH (US)

(73) Assignee: ArvinMeritor Technology LLC, Troy, MI (US)

( * ) Notice: Subject to any disclaimer, the term of this patent is extended or adjusted under 35 U.S.C. 154(b) by 424 days.

This patent is subject to a terminal disclaimer.

(21) Appl. No.: 10/776,068

(22) Filed: Feb. 11, 2004

(65) Prior Publication Data

US 2005/0173885 A1 Aug. 11, 2005

(51) Int. Cl.
*B62K 13/00* (2006.01)

(52) U.S. Cl. ................. 180/209; 280/149.2; 280/407.1

(58) Field of Classification Search ............. 280/149.2, 280/407.1; 180/209
See application file for complete search history.

(56) References Cited

U.S. PATENT DOCUMENTS

| | | | | |
|---|---|---|---|---|
| 3,177,002 A | * | 4/1965 | Schmidt | ................. 280/81.1 |
| 4,641,846 A | * | 2/1987 | Ehrhart | ................. 280/149.2 |
| 5,137,296 A | * | 8/1992 | Forman | ................. 280/407.1 |
| 5,531,467 A | * | 7/1996 | Schueman | ............ 280/149.2 |
| 5,546,828 A | | 8/1996 | Golarz | |
| 5,564,725 A | | 10/1996 | Brazeal | |
| 5,720,489 A | | 2/1998 | Pierce et al. | |
| 5,813,682 A | | 9/1998 | Stevens | |
| 6,213,489 B1 | | 4/2001 | Eckelberry | |
| 6,279,933 B1 | | 8/2001 | Ross et al. | |
| 6,409,192 B1 | | 6/2002 | Botts | |
| 6,435,536 B2 | | 8/2002 | Eckelberry | |
| 6,471,227 B2 | | 10/2002 | Eckelberry et al. | |
| 6,488,303 B1 | | 12/2002 | Cobb | |
| 6,641,157 B2 | | 11/2003 | Eckelberry et al. | |
| 2005/0056477 A1 | * | 3/2005 | Saieg et al. | ................. 180/209 |

* cited by examiner

Primary Examiner—Lesley D. Morris
Assistant Examiner—Tiffany Webb
(74) Attorney, Agent, or Firm—Carlson, Gaskey & Olds

(57) ABSTRACT

A locking pin system is operated through an air spring which rotates a torque tube to remove a spring bias from a multiple of locking pins. Operation of the locking pin system is controlled by a trailer spring brake valve which operates in response to actuation of the slider parking brakes.

15 Claims, 5 Drawing Sheets

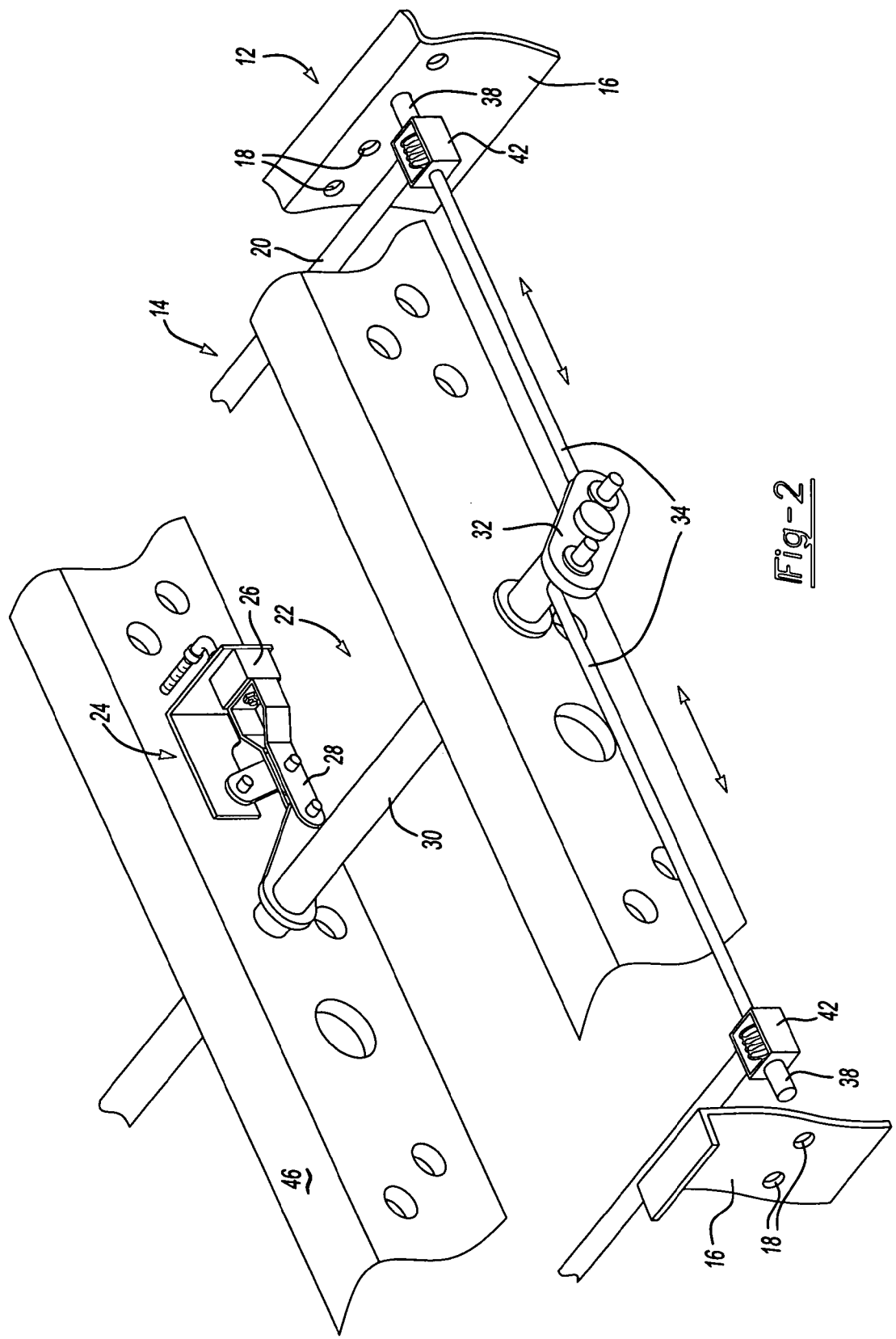

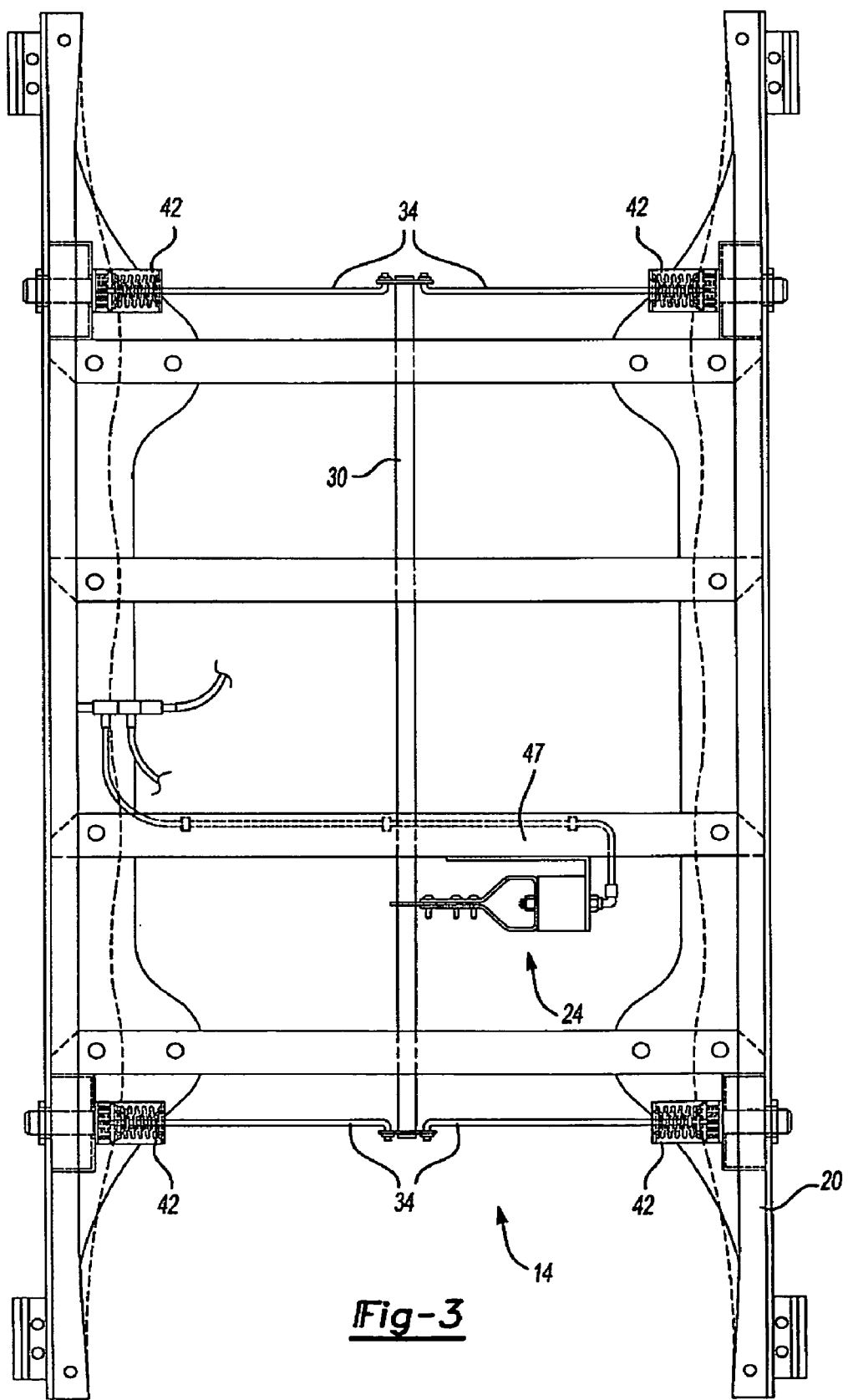

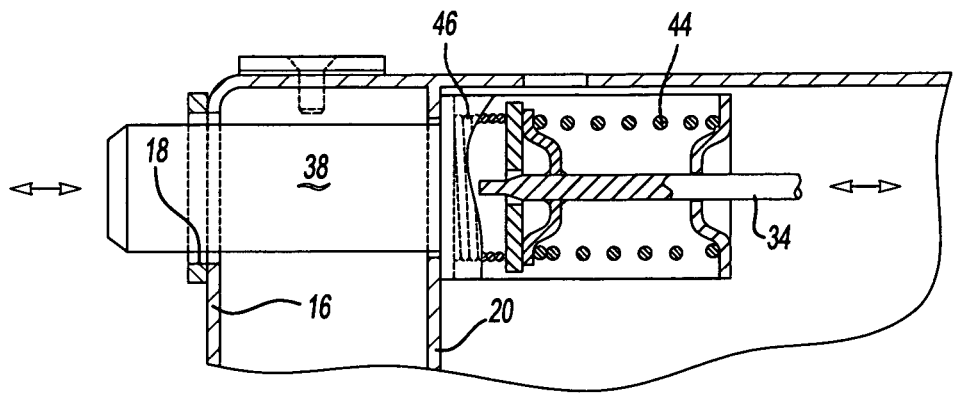
_Fig-4_
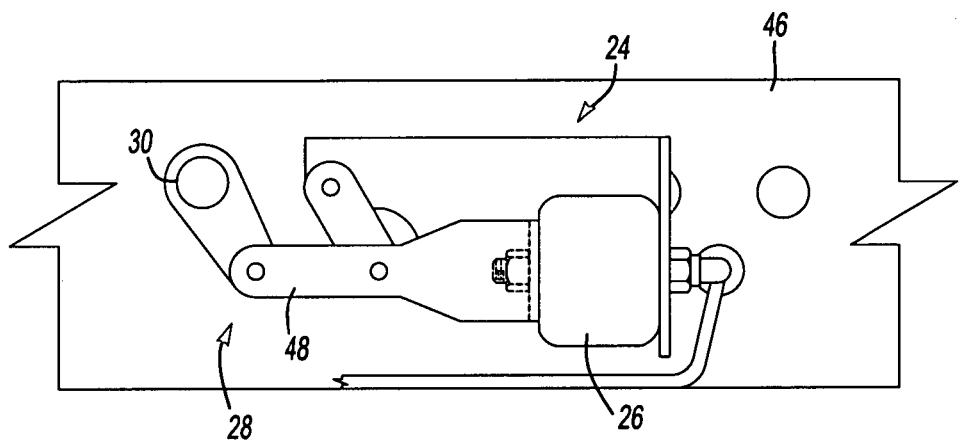
_Fig-5A_
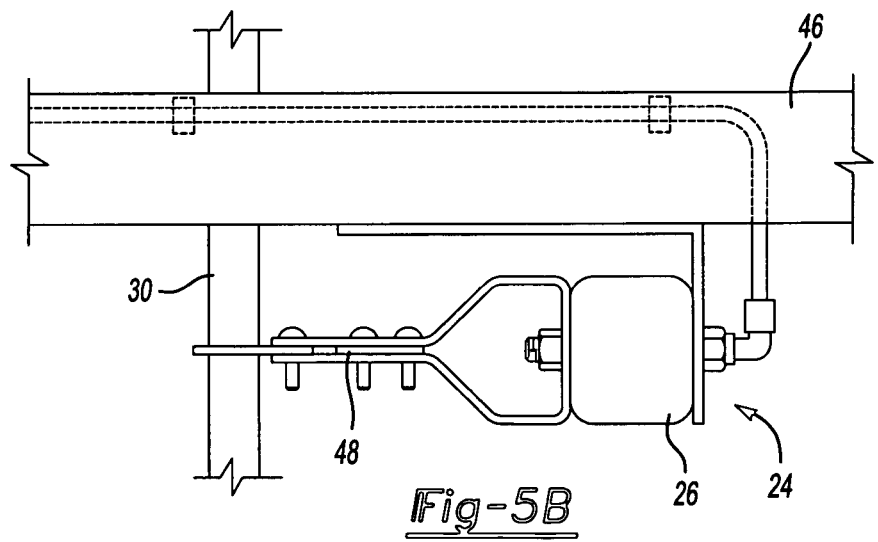
_Fig-5B_ ial arrangement is disclosed in the illustrated embodiment, other arrangements will benefit from the instant invention.
PNEUMATIC LOCKING PIN OPERATING SYSTEM FOR A TRAILER SLIDER

BACKGROUND OF THE INVENTION

The present invention relates to a trailer slider system, and more particularly to an operating system and parking brake interlock for the locking pins thereof.

Heavy combination vehicles typically include a tractor and one or more trailers. Trailers often incorporate a movable subframe commonly referred to as a slider. A slider generally includes a pair of axles, a suspension, and an apparatus for adjusting and locking the position of the slider along the length of the trailer. Typically, a linkage is actuated and locking pins are moved to engage selected holes in the frame rails of the trailer. With the locking pins retracted from the holes, the slider position may be adjusted along the length of the frame rails. Once the slider reaches a desired position, the actuation element is operated and the locking pins are extended into the trailer frame holes.

One challenge with the use of a slider is ensuring that the locking pins are engaged in the holes before the tractor begins to pull the trailer. Disadvantageously, if the locking pins are not fully engaged, then it may be possible for the slider to move relative the trailer.

Various known systems interlock the parking brake to the locking pin position. In one of these systems, if the locking pins are not engaged, then a valve will be in a position preventing flow of pressurized air to the parking brake control valve. As is known, vehicle parking brakes typically include a large spring that moves to set the brake, preventing movement of the trailer. With the parking brakes set, the trailer cannot move. Thus, this known system prevents the trailer from moving unless the locking pins are engaged.

Trailers are equipped with an air supply line that is used to charge the trailer air reservoir and to retract the parking brakes. A parking brake control valve directs air to the parking brakes and then to the reservoir. This valve also prevents loss of reservoir pressure when the supply line is disconnected. The reservoir supplies pressurized air to operate the service brakes and is also used for various other applications on the trailer. Another known system provides a pin interlock valve that vents the supply line from the tractor and blocks any flow at the inlet to the parking brake control valve. Thus, in this known system when the interlock valve vents the supply of pressurized air, the reservoir will not charge.

Blocking the inlet to the parking brake control valve may actually lock the parking brakes in a release position if they are already released prior to the locking pins moving out of engagement. That is, if the parking brakes are released, and for whatever reason the pins are then withdrawn, the parking brakes cannot be set, and would stay in the released position. Furthermore, when the valve opens to vent the flow of air from the pressurized air supply line, the valve blocks the line leading to the parking brake control valve. This could potentially lock the air already in the parking brake chamber, again holding the brake away from the parked position.

Another problem with the prior art arrangement is that if the reservoir is not charged when the supply line is vented, there may not be air to drive accessories. Many of the locking pin drives are pneumatically powered and in the absence of pressurized air in the reservoir, these systems may not permit actuation of the locking pins.

Accordingly, it is desirable to provide a locking pin system that is readily actuated yet provides failsafe engagement of the slider with the trailer.

SUMMARY OF THE INVENTION

The locking pin system according to the present invention permits adjustment of a slider relative to a trailer. The locking pin system is operated through an air spring which rotates a torque tube to remove a spring bias from a multiple of locking pins. Operation of the locking pin system is controlled by a trailer spring brake valve which operates in response to actuation of the slider parking brakes.

A trailer spring brake valve resets a pull handle valve in response to the parking brakes being disengaged. Even if the locking pin air spring is in an actuated position, releasing of the parking brakes causes the trailer spring brake valve to reset and vent air pressure from the locking pin air spring.

If the locking pins are not aligned with openings in the frame rail when the locking pin system is released, later movement of the slider rail relative the frame rail will eventually align the openings and permit the locking pins to lock the slider to the trailer.

The present invention therefore provides a locking pin system that is readily actuated yet provides failsafe engagement of the slider with the trailer.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2 is a perspective view of the slider and locking pin system;

FIG. 3 is a top planar view of the slider and locking pin system;

FIG. 4 is an expanded view of one locking pin and associated spring bias assembly;

FIG. 5A is a side view of an actuator assembly that actuates the locking pin system.

FIG. 5B is a top view of the actuator assembly of FIG. 5A;

DETAILED DESCRIPTION OF THE PREFERRED EMBODIMENT

Figure 1:
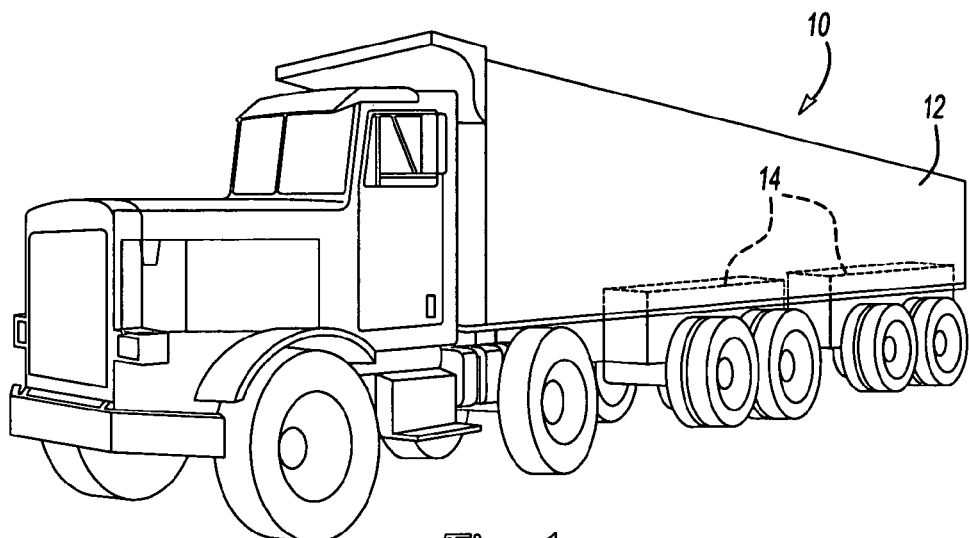
FIG. 1 is a general view of an exemplary vehicle embodiment for use with the present invention.

FIG. 1 illustrates a general view of a trailer and slider combination 10. The trailer 12 is supported by the slider 14, which carries the wheels, suspension, brakes, etc. The slider 14 is typically movable between several positions (Position 1, Position 2, etc.) as desired. It should be understood that although a particular component arrangement is disclosed in the illustrated embodiment, other arrangements will benefit from the instant invention.

Referring to FIG. 2, the trailer 12 typically includes a pair of frame rails 16 having openings 18. Each slider 14 has its own rails 20 which supports a locking pin system 22. An actuator 24 is operable to retract the locking pin system 22 and permit the slider 14 to move relative to the trailer 12 to permit position adjustment of the slider (FIG. 1).

The actuator assembly 24 preferably includes an air spring 26 that drives a lever 28 mounted to a torque tube 30.

Rotation of the torque tube 30 rotates a bracket 32. The bracket 32 rotates to change the position of a set of links 34. A locking pin 38 is mounted to each of the links 34. Each of the locking pins 38 selectively extends into and is retracted from the openings 18 in each frame rail 16 of the trailer 12. It should be understood that although a single pair of locking pins 38 are specifically described, any number of locking pins, preferably four, and associated links may be engaged with the torque tube 30.

The multiple of incrementally spaced openings 18 along the length of the frame rails 16 provide engagement positions for the slider 14. The locking pins 38 engage in a selected set of openings 18 to lock the slider to the frame rails 16 at a selected position. The locking pins 38 are preferably mounted through a spring bias assembly 42, which is known and is illustrated in a somewhat simplified manner in FIG. 2.

Referring to FIG. 4, the spring bias assembly 42 permits the torque tube 30 to rotate and the link 34 to be drawn away from the locking pin 38 even if the pin 38 is temporarily trapped in the frame rails 16. That is, the link 34 is pulled away from the stuck pin 38 but the pin 38 remains in place within the frame rails 16 typically due to the pin 38 being pinched between the frame rail 16 and the slider rail 20. It should be understood that although only a single pin is illustrated in FIG. 4, this is for example only and that any pin may become "pinched" and that each spring bias assembly 42 is independently operational.

The movement of the link 34 relative the pinched pin 38 is accommodated by a link. spring 44 which otherwise maintains pressure on the pin 38 to assure the pin 38 is fully seated between the frame rail 16 and the slider rail 20. Once the trapped pin is freed from the frame rail 16. such as by slightly moving the trail a locking pin spring 46 drives the pin out of the frame rail openings 18 as the bias from link spring 44 is removed from the pin 38. That is, the locking pin spring 46 is normally compressed by the link spring 44 and that compression is only overcome when the when the link 34 is retracted by the actuator 24.

Referring to FIG. 5A, the actuator 24 is mounted to a cross-brace 47 between the rails 20 of the slider 14. The lever 28 preferably includes a four-bar linkage 48 (also illustrated in FIG. 5B) to direct the motion of the air spring 26. Actuation of the air spring 26 operates the locking pin system 22 to move the pins 38 toward a non-engaged position. When the air spring 26 is vented, the torque upon the torque tube 30 is relaxed and the link spring 44 (FIG. 3) biases each of the associated pins 38 toward the openings 18.

Figure 6:
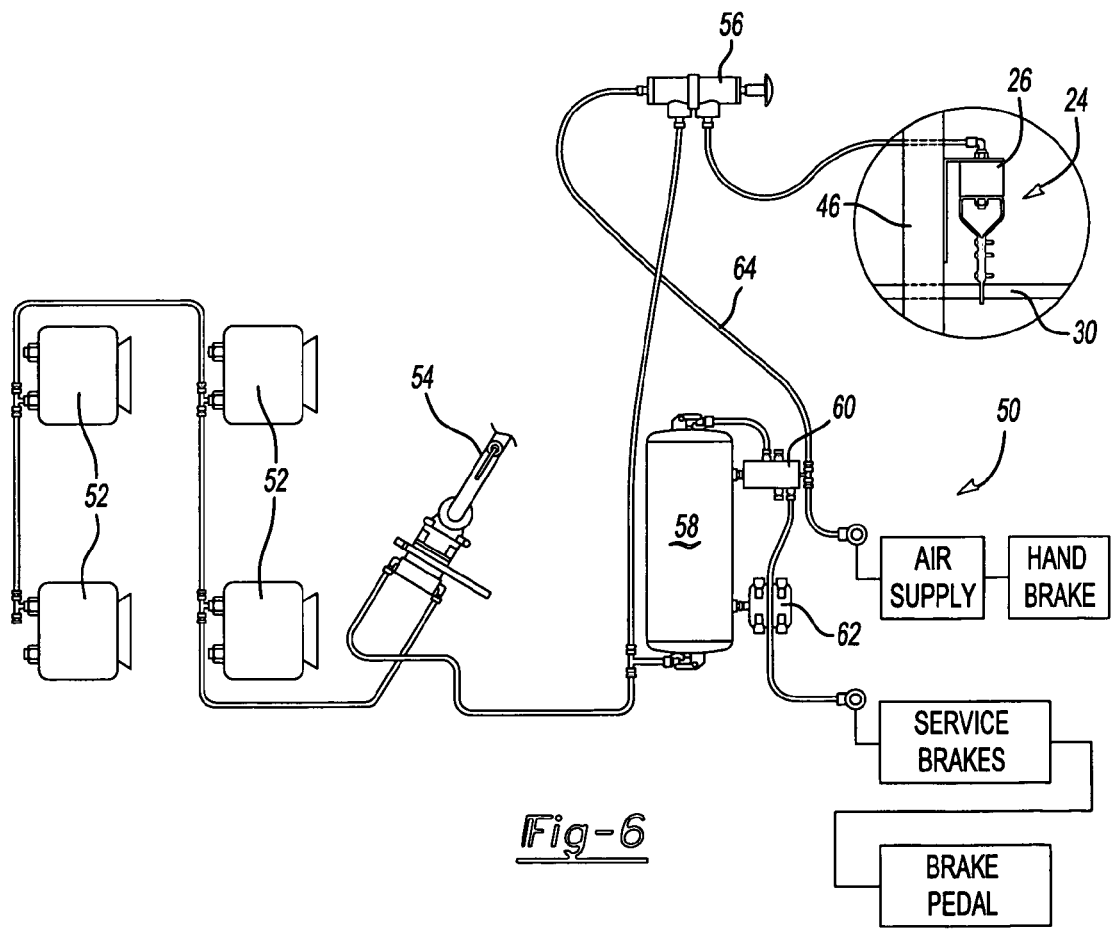
FIG. 6 is a schematic view of a vehicle pneumatic system for use with the present invention.

Referring to FIG. 6, a pneumatic system 50 for the slider 14 generally includes a multiple of suspension air springs 52, an air spring ride height valve 54, a locking pin hand valve 56, an air reservoir 58, a trailer spring brake valve 60 and a pilot relay valve 62. The actuator 24 is preferably operated by pressing the hand valve 56. Operation of the hand valve 56 permits pressurization of the air spring 26 from the reservoir 58 and the resultant disengagement of the locking pin system 22 as described above. The hand valve 56 is preferably mounted directly on the slider 14.

Figures 7A, 7B:
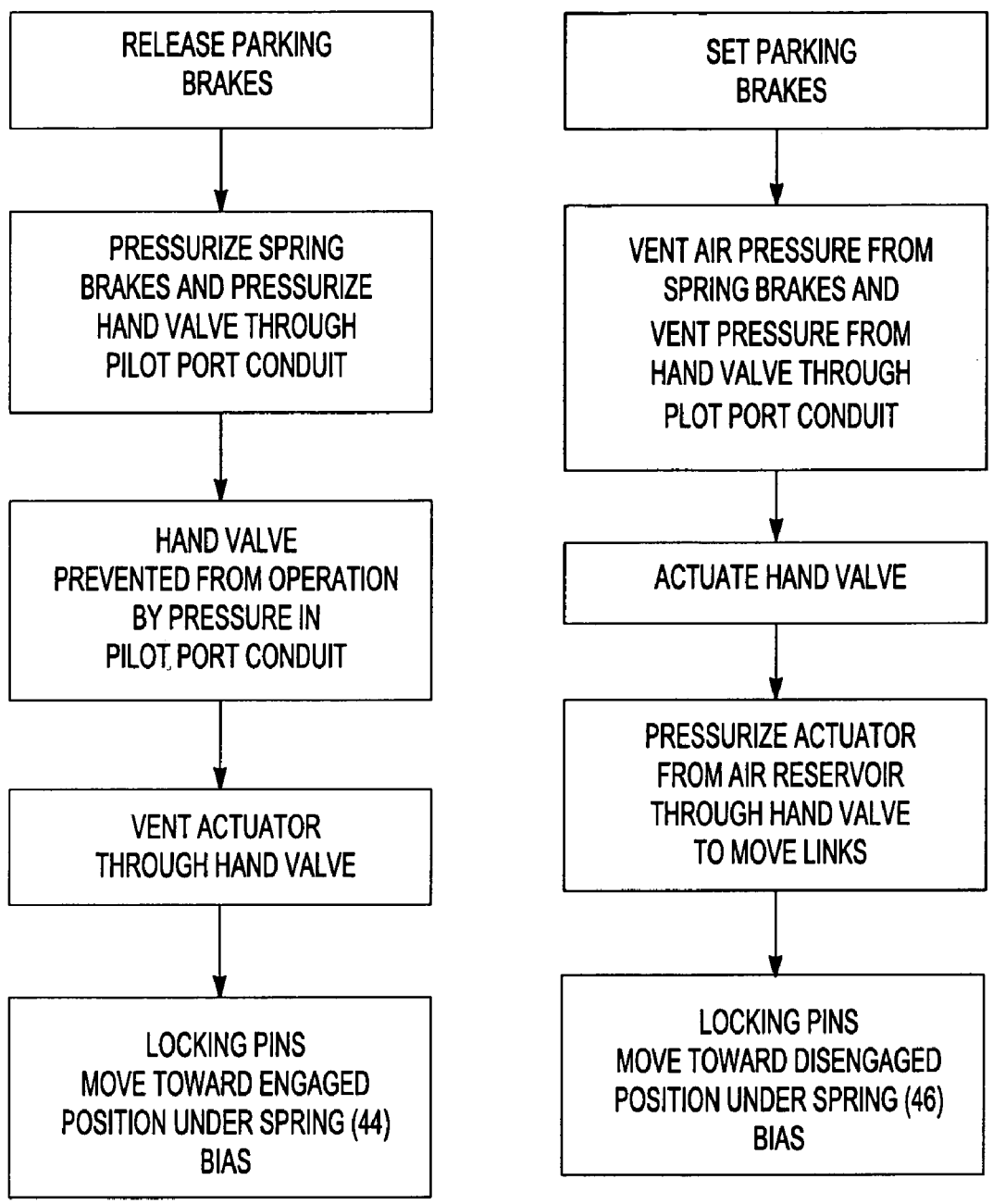
FIG. 7A is a flowchart showing system operation in response to releasing of the parking brakes.
FIG. 7B is a flowchart showing system operation in response to setting of the parking brakes.

Operation of the locking pin system 22 is controlled by the trailer spring brake valve 60, which operates as a control in response to the parking brakes. The trailer spring brake valve 60 communicates with the hand valve 56 through a pilot port conduit 64. When the parking brakes are released (FIG. 7A), air pressure is communicated from the tractor air supply to disengage the spring brakes. As is known, vehicle parking brakes typically include a spring that moves to set the parking brakes when air is released from the air chambers that prevents movement of the trailer. When the parking brakes are disengaged air pressure is also communicated through the pilot port conduit 64 to lock the hand valve 56 to prevent operation thereof.

Conversely, when the parking brakes are engaged (FIG. 7B), air pressure is vented from the spring brakes and mechanical springs engage the spring brakes. Also, air pressure is vented from the hand valve 56 through the pilot port conduit 64 such that the hand valve 56 may be operated. Operation of the hand valve 56 when the parking brakes are set communicates air pressure from the reservoir 58 through the hand valve 56 and into the actuator 24 to disengage the locking pin system 22.

The trailer spring brake valve 60 resets the hand valve 56 whenever the parking brakes are disengaged. Releasing of the parking brakes pressurizes the hand valve 56 through the pilot port conduit 64 such that the hand valve 56 cannot be operated. That is, when the spring brakes are pressurized or deactivated by air pressure from the air supply, the hand valve 56 is also pressurized to prevent operation of the hand valve 56. Even if the air spring 26 is in a pressurized condition and the locking pin system 22 is disengaged, releasing of the parking brakes vents the air pressure from the air spring 26 through the hand valve 56 to permit re-engagement of the locking pin system 22. In other words, the mechanical spring bias of both the spring brake parking brakes and the locking pin system take over when the parking brakes are deactivated through supply of air pressure from the air supply.

The locking pin system 22 is deactivated whenever the parking brakes are not engaged. When the air spring 26 of the actuator is vented, the link spring 44 biases the pin 38 toward an engaged position (FIG. 4). That is, the torque tube 30 is released and the links 34 no longer provide a force which maintains the pins 38 in the non-engaged position.

If the openings 18 in the frame rail 16 are not aligned with the locking pins 38, later movement of the slider 14 relative the frame rail 16 will eventually align the locking pins 38 with the openings 18 which will permit the link spring 44 to engage the pin 38 and lock the slider 14 to the trailer 12. Failsafe engagement of the slider 14 to the trailer 12 is thereby achieved.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A slider system comprising:
   a locking pin movable between an engaged position and a non-engaged position,
   a locking pin spring which provides a locking pin spring bias to bias said locking pin toward said non-engaged position;

a link pin spring which provides a link pin spring bias to bias said locking pin toward said engaged position, said locking pin spring bias being greater than said link pin spring bias;

an actuator to overcome said link pin spring bias to permit said locking pin spring bias to bias said locking pin toward said non-engaged position;

a first valve in communication with said actuator; and a trailer spring brake valve in communication with said first valve and an air supply, said trailer spring brake valve operable to vent said actuator through said first valve such that said locking pin is movable toward said engaged position by said locking pin spring.

2. The slider system as recited in claim 1, wherein said first valve comprises a hand operated valve.

3. The slider system as recited, in claim 1, wherein said actuator comprises an air spring.

4. The slider system as recited in claim 3, further comprising a lever which rotates a torque tube to drive said locking pin toward said non-engaged position, said lever operated by said air spring.

5. The slider system as recited in claim 4, wherein said air spring is constrained by a four-bar linkage.

6. The slider system as recited in claim 3, wherein an auto-reset valve vents said air spring in response to said trailer spring brake valve.

7. The slider system as recited in claim 3, wherein an auto-reset valve deactivates said air spring in response to said trailer spring brake valve.

8. The slider system as recited in claim 1, further comprising a pull-handle which operates said actuator.

9. The slider system as recited in claim 1, wherein said link pin spring is disposed at least partially around said locking pin.

10. The slider system as recited in claim 9, wherein said link pin spring is disposed at least partially around a link in contact with said locking pin spring, said link linked to said pneumatic actuator for movement therewith.

11. A method of securing a slider to a trailer comprising the steps of:
 (1) releasing a parking brake;
 (2) exhausting a pneumatic actuator in response to said step (1); and
 (3) releasing a link spring which biases a locking pin toward an engaged position in response to said step (2) to overcome a locking pin spring bias that otherwise biases said locking pin toward a non-engaged position.

12. The method as recited in claim 11, wherein said step (2) further comprises:
 venting the pneumatic actuator through a first valve.

13. The method as recited in claim 11, wherein said step (1) further comprises:
 venting a trailer spring brake valve in communication with the pneumatic actuator prior to said step (2).

14. A method of sliding a slider relative to a trailer comprising the step of:
 (1) setting a parking brake;
 (2) closing a trailer spring brake valve in communication with a pneumatic actuator in response to said step (1);
 (3) actuating a handle valve;
 (4) pressurizing the pneumatic actuator through the handle valve from a reservoir, and
 (5) retracting a link pin spring that is biasing a locking pin toward an engaged position in response to said step (4) to permit a locking pin spring bias to bias the locking pin toward a non- engaged position to permit the slider to slide relative the trailer.

15. The method as recited in claim 14, wherein said step (5) further comprises:
 pneumatically retracting a link to overcome a bias from the locking spring which biases the locking pin toward the engaged position.

\* \* \* \* \*